United States Patent [19]
Ghosh et al.

[11] Patent Number: 5,908,588
[45] Date of Patent: Jun. 1, 1999

[54] INCIPIENT FLOCCULATION MOLDING OF PARTICULATE INORGANIC MATERIALS

[75] Inventors: Syamal K. Ghosh; Dilip K. Chatterjee, both of Rochester; James S. Reed, Alfred; Steven R. Arrasmith, Rochester, all of N.Y.

[73] Assignee: Eastman Kodak Company, Rochester, N.Y.

[21] Appl. No.: 09/024,063

[22] Filed: Feb. 17, 1998

[51] Int. Cl.[6] .................................................. C04B 38/06
[52] U.S. Cl. ............................ 264/28; 264/37; 264/669; 264/670; 264/645; 419/33; 419/34; 419/35; 419/36; 419/37; 419/63; 419/64; 419/65
[58] Field of Search ..................................... 264/669, 670, 264/28, 37, 645; 419/33, 34, 35, 36, 37, 63, 64, 65

[56] References Cited

U.S. PATENT DOCUMENTS

| | | |
|---|---|---|
| 2,251,454 | 8/1941 | Jeffery . |
| 3,238,048 | 3/1966 | Somers ..................................... 264/669 |
| 3,238,049 | 3/1966 | Somers ..................................... 264/669 |
| 4,752,857 | 6/1988 | Khoury et al. .......................... 264/669 |
| 5,238,627 | 8/1993 | Matsuhisa et al. ...................... 264/670 |

OTHER PUBLICATIONS

T.J. Graule, W. Si, F.H. Baader and L.J. Gauckler of the Swiss Federal Institute of Technology, "Direct Coagulation Casting: Fundamentals of a New Forming Process for Ceramics," pp. 457–461 in Ceramic Transactions vol. 51: Ceramic Processing Science and Technology, edited by Hans Hausner, Gary L. Messing and Shin–ichi Hirano, American Ceramic Society, Westerville, Ohio, 1995.

*Primary Examiner*—James Derrington
*Attorney, Agent, or Firm*—Arthur H. Rosenstein

[57] ABSTRACT

A process of molding inorganic materials into desired shapes comprises mixing the material with a dispersant, milling, molding the mixture, drying the mixture and sintering.

16 Claims, 3 Drawing Sheets

INCIPIENT FLOCCULATION MOLDING OF PARTICULATE INORGANIC MATERIALS

FIELD OF THE INVENTION

The present invention relates to a novel process for molding inorganic materials having good green strength and which are capable of being formed into complex shapes.

BACKGROUND OF THE INVENTION

Powder injection molding (PIM) processes offer the possibility of molding complex net-shape components with high precision using highly automated equipment. It is anticipated that as in the plastic industry, automated injection molding of high precision inorganic components, such as ceramic, metals, cermets and intermetallics would make it cost-effective and competitive. Injection molding of particulate inorganic materials occurs in a manner analogous to injection molding of plastics. A granular precursor material composed of ceramic or metal powder dispersed in a thermoplastic organic binder system is heated until it softens and is forced into a mold cavity under high pressure such as 30 MPa or higher and cooled. The organic binder is then removed at a relatively low temperature by a process commonly known as "debinding", and the debinded components are sintered at a relatively higher temperature. Shrinkage of the thermoplastic binder can lead to internal defects in the molded part. The debinding process is generally slow and can take as long as several days. Binder removal can also generate defects such as deformation and voids and cracks in the sintered part. The high pressure along with abrasivity of the ceramic and other inorganic particles contribute to rapid tool wear in the PIM process.

Since the advent of popularity of high performance ceramics, considerable efforts have been expended to come up with a viable ceramic powder injection molding (CPIM) process which may be applied to all ceramic powders regardless of particle size, however, despite considerable investment of time and money by various research communities all over the world, CPIM has failed to deliver the desirable end products. The first and foremost reason for this is that the productivity of CPIM is not as high as anticipated. While it may take only a few seconds or a minute to mold a component, the total production time can be a week or longer. Also, defect distributions characteristic of CPIM limit the reliability of molded components as compared to other conventional ceramic forming processes. As a result, CPIM is currently used primarily to manufacture non-critical components such as textile thread guides, investment casting cores, and coarse refractories. The use of CPIM to manufacture high performance and reliable ceramic components having high productivity is still not possible.

The direct coagulation casting (DCC) process involves the coagulation of an electrostatically stabilized ceramic slurry. An in situ enzyme catalyzed reaction is used to change the pH or increase the ionic strength of the slurry to coagulate the slurry and cause it to "set". Remarkable Weibull moduli have been reported, which indicates that a very uniform and high-quality microstructure is achieved rendering the molded components more reliable than before. This process seemingly meets many of the requirements for an improved forming process except for difficulties in controlling the reaction time. The window for gelation time is in terms of only several minutes which makes it impractical to implement the DCC as a production injection molding process.

DCC has been recently described by T. J. Graule, W. Si, F. H. Baader and L. J. Gauckler of the Swiss Federal Institute of Technology, "Direct Coagulation Casting: Fundamentals of a New Forming Process for Ceramics," pp. 457–461 in Ceramic Transactions Vol. 51: Ceramic Processing Science and Technology. Edited by Hans Hausner, Gary L. Messing and Shin-ichi Hirano. American Ceramic Society, Westerville, Ohio, 1995.

Binder Coagulation Casting (BCC) is another process for molding ceramics which is described in U.S. patent application Ser. No. 08/931,174 filed Sep. 16, 1997. In the BCC process an aqueous ceramic slurry containing polyelectrolyte deflocculants such as polycarboxylic acid and high molecular weight binder is gelled in a controlled fashion by the action of a chemical initiator and/or by increasing the temperature of the slurry. The mechanism by which gelation occurs is the coagulation of dispersed ceramic particles by high molecular weight binder molecules as the level of adsorption and conformation of polymer molecules change as the pH of the system changes.

Obviously, there are numerous potential applications of ceramic components that would become technically and economically feasible if there was a more productive forming technique than the current CPIM that could produce reliable complex-shaped components with fewer defects. The ideal forming technique must be able to produce complex shapes at high rates (less than a minute per part) and high yield (>90%) with excellent dimensional control and minimal internal defects. The total manufacturing cycle should be reduced to few days instead of few weeks.

SUMMARY OF THE INVENTION

This invention relates to a forming process which surmounts all the difficulties that are currently being encountered. The invention relates to Incipient Flocculation Molding (IFM)—a novel near-net shape injection molding technique intended for manufacturing ceramic components, but which ideally can be applied to other inorganic particulate materials. The IFM process overcomes the problems and difficulties commonly associated with conventional CPIM systems. The novel and advantageous aspects of IFM arise from its unique mechanism for controlling the states of flow and quiescence of the ceramic particles during the forming process. Conventional CPIM systems disperse the ceramic particles in a matrix of high molecular weight wax or polymer that melts or softens to permit flow. The advantageous aspect of the IFM process is that there is no wax or polymer binder, thereby eliminating time consuming debinding processes. The invention relates to dispersing inorganic particles such as ceramic particles in a liquid solvent and the interparticle forces are manipulated to control the fluidity of the system through the use of a temperature dependent deflocculant. This approach is a fundamental departure from the prior art in the field of CPIM.

The most advantageous effect of replacing the molten wax or polymer with a liquid solvent is that the viscosity of the system is lowered significantly. The system has the rheological characteristics of an easily pourable slurry rather than a highly viscous dough-like mass. Consequently, the ceramic particles can be mechanically dispersed using a high shear-rate device such as a ball mill or an attritor mill. This enables the efficient elimination of powder agglomerates from the slurry. Conventional CPIM systems must be dispersed using a high-shear device such as a sigma-type mixer, often with limited success. Lower viscosity of the slurry renders it possible to filter the slurry to remove any undispersed agglomerates or foreign bodies. The elimination of the high molecular weight wax or polymer from the system also permits the use of finer (submicron) ceramic powders that possess superior structural properties in the sintered state.

Other advantageous effects of the IFM technique are: (1) that the processing solvent can be quickly eliminated from the molded green part by evaporation thereby eliminating a long debinding step, (2) the low viscosity also enables filling mold cavity more efficiently, (3) the flocculation mechanism results in a very uniform packing of the particles in the molded component, and (4) there is no volume change when the liquid slurry is transformed into the solid state by controlled flocculation. Only the dispersant, which may amount to 2% by weight, remains to be quickly burned out in the early stages of sintering.

The temperature dependent deflocculation is reversible such that sprues, runners and other rejects can be recycled at any point before sintering, thus making the IFM process very cost-effective and efficient. Many high performance ceramic powders are very costly (>$50/lb.). Therefore, recycling rejected parts without compromising the mechanical and physical properties of the sintered end products contributes to the competitiveness of the IFM process.

This invention relates to a novel forming process based upon the manipulation of a concentrated sterically-stabilized suspension of inorganic particulates. It is applicable to ceramic, cermets, metals, intermetallics and composites. Besides injection molding, the mechanism in IMF has potential applications in other particulate material forming processes, such as extrusion, slip casting, screen printing, tape casting and rapid prototyping.

For a better understanding of the present invention, together with other and further objects, advantages and capabilities thereof, reference is made to the following detailed description and appended claims in connection with the preceding drawings and description of some aspects of the invention.

DETAILED DESCRIPTION OF THE INVENTION

Figure 1:
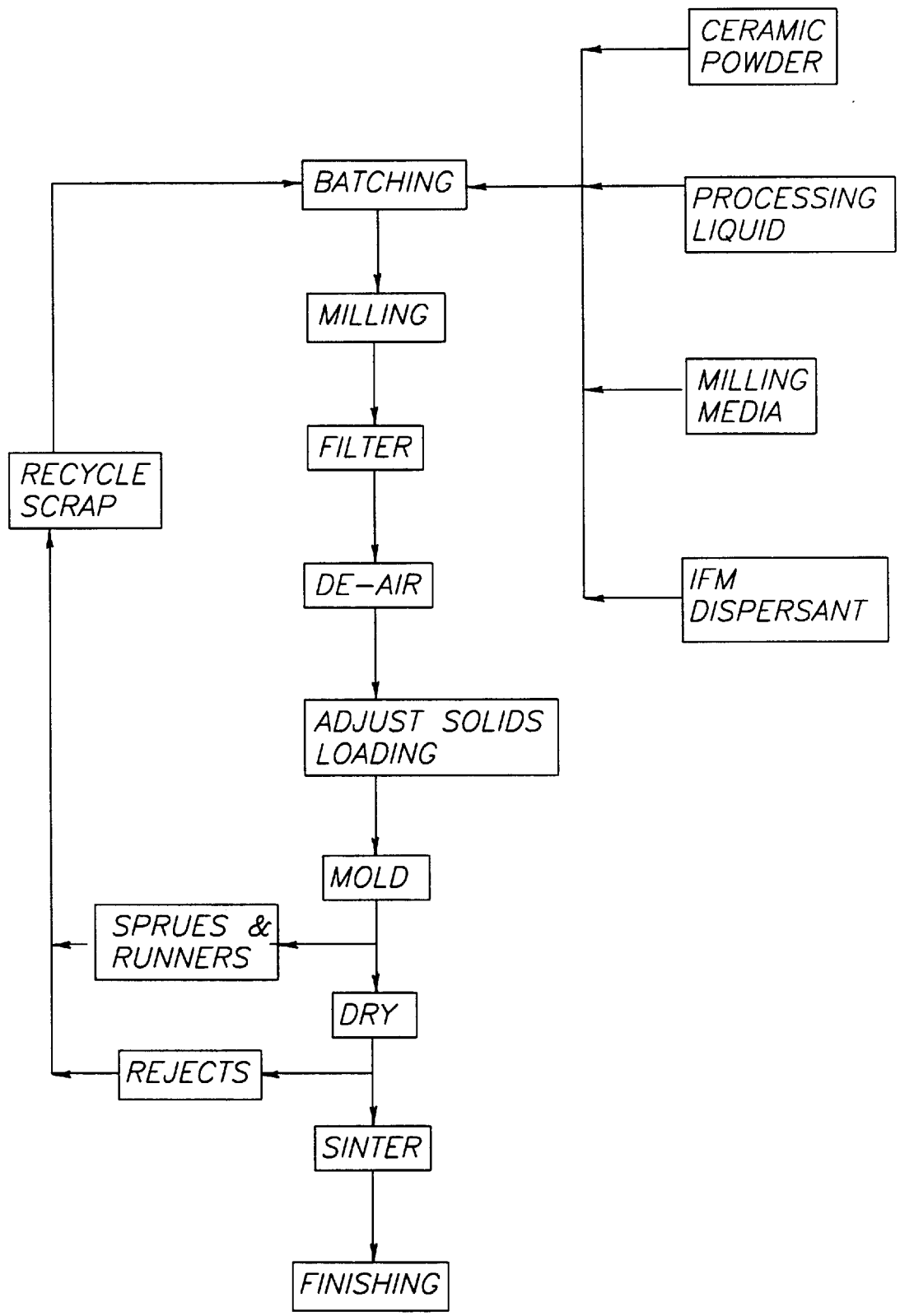
FIG. 1 is a flow chart for a generalized incipient flocculation molding process of this invention.

Referring to FIG. 1, a generalized flow-chart of the IFM process utilizing ceramic materials is shown. A suitable dispersant is grafted, adsorbed or subsequently attached to the inorganic (ceramic) particle surfaces and then mixed with a processing liquid or solvent, milling media are added, batched and then milled in a ball mill or attritor mill or the like at a temperature where the dispersant acts as a good steric-stabilizer or flocculant. After milling for several hours to disperse agglomerates the slurry is filtered and placed in a vacuum chamber to de-air. In general, the slurry can be de-aired by placing the whole slurry in a vacuum chamber, or by pumping through a small chamber exposed to vacuum, or by pumping through a fine sieve. The above processing step is conducted at a temperature where the system is deflocculated. The slurry is then forced into a mold using a very low pressure. The mold is kept at a lower temperature where the slurry is flocculated and gelled. The gelled green part is maintained at the low temperature, removed from the mold and is allowed to dry by driving off the solvent. The dry green part is then sintered using a conventional sintering step. It is then sent off for final finishing. Sprues, runners and rejects are picked up as recycle scrap and recycled to the batching section before sintering.

More particularly, this invention relates to grafting dispersant such as polyethylene glycol (PEG), long-chain alcohols such as stearyl alcohol, polyacrylic acid (PAA) such as polymethacrylic acid, or modified cellulose such as methyl cellulose, hydroxy propyl cellulose, polyethylene oxide and the like. The dispersant used must possess temperature-dependent solubility in the processing liquid. It is particularly preferred to use dispersants such as polyethylene glycol (PEG) grafted to particulate inorganic powders such as alumina, stabilized zirconia, partially-stabilized zirconia, silicon carbide, silicon nitride, magnesia, titania and alumina-zirconia composite powders. The grafting procedures are described more fully later. The grafted powder is then mechanically dispersed in processing liquid such as ethanol, z-propanol, z-butanol and the like. The dispersant must possess temperature-dependent solubility in the process liquid. Particularly preferred processing liquids are either 2-propanol or 2-butanol (alcohol) or solutions of them in a closed container at approximately 65° C., where the system is deflocculated and well dispersed by milling, filtering and deairing.

The milling step is accomplished by adding milling media such as alumina, stabilized zirconia, silicon carbide, and the like to the powder with the attached dispersant in the processing liquid and milling by using a ball mill or attritor mill. The milling can be carried out for from 2 to 24 hours, preferably about 6 hours at a temperature of from 55 to 70° C.

The filtering is optional but when used it is done by flowing the slurry through a fine screen.

The deairing step, which is also optional but preferred, comprises exposing the slurry to a vacuum, pumping downward through a sleeve. Optionally solids loading into the mold is adjusted by adding additional powder or evaporating excess solvent.

The slurry is then injected into a mold and cooled at a temperature from 30 to −20° C., and preferably below 25° C., where it flocculates and gels to a rigid shape. The molded green ceramic part is then dried at a temperature from −20° C. to 25° C. and preferably around 15° C. The dried ceramic green part is then sintered at a temperature of 1500 to 1800° C. and preferably 1600° C. for 0.5 to 4 hours (preferably 2 hours for alumina).

In working examples of the present invention, the particular materials are ceramic (alumina) and the dispersant was PEG grafted onto the alumina particles. Other ceramic material useful herein are fused silica, stabilized $ZrO_2$, silicon carbide, silicon nitride, zirconia-alumina composites, and the like.

Materials

The preferred dispersant polyethylene glycol (PEG) compounds (Carbowax® PEG 600, PEG 1000, PEG 4600, PEG 8000, PEG compound 20M, Union Carbide Corporation, S. Charleston, W. Va.) used are of nominal molecular weights ($M_w$) of 600, 1000, 4600, and 8000 respectively. Also used was PEG Compound 20M which consists of two PEG 8000 molecules linked by a di-epoxide linking group. PEG Compound 20M also contains an unspecified fraction of unlinked PEG 8000 molecules and trimolecular groups, and should be considered to have a multimodal molecular weight distribution.

Two reactive grades of Bayer-process α-alumina can be used as the inorganic material. Those used were A-16SG alumina (Type A) and A-39SG alumina (Type B), both from Alcoa Ind. Chemicals, Bauxite, Ark. Both aluminas, A-16SG and A-39SG have very similar particle size distributions, having average particle size 0.35 and 0.4 μm, and specific surface area 7.9 and 7.22 $m^2/g$ respectively. The principle difference between the two aluminas is that A-16SG contains 0.04 wt % MgO as a grain-growth inhibitor. No MgO is added to A-39SG, and it contains less sodium and calcium than A-16SG.

Grafting

Two methods were used to graft dispersants such as PEGs having various molecular weights as described above, to Type A and Type B alumina powders. The first grafting technique (coat-then-graft) involved coating the alumina powders with PEGs by dispersing them in an aqueous PEG solution followed by spray drying. Alternatively, a series of dispersant-solvent systems can be used to disperse inorganic particulate materials. The dispersant-solvent systems include polyacrylic acid (as a dispersant) in 0.2M HCl solution; chemically modified cellulose, such as methylcellulose, hydroxypropyl cellulose or hydroxypropyl cellulose in aqueous solution; stearyl alcohol in benzene; polymethyl acrylic acid (PMAA) in aqueous solution; and polyethylene oxide in aqueous solution. The grafting reaction was completed by heating the granules in a vacuum oven. This technique uses standard processing equipment and was very efficient in its use of PEG. The second grafting technique (the molten-PEG reaction) involved dispersing alumina powders in an excess of molten PEG in a closed container which was backfilled with an inert gas like argon or nitrogen. The ungrafted PEG was removed by repeated washing with distilled water. This method used more PEG than the first method, but assured that a saturation level of PEG was available at the particle surfaces for the grafting reaction. It was possible to graft significant amount of PEG to the surface of ceramic powders using either of the above grafting methods. The polymer was strongly bonded to the ceramic particle surfaces and was not easily removed by severe agitation in a good solvent such as water. The grafting was accomplished using PEGs having different molecular weights. The grafting level, using the first method, reached an equilibrium value in approximately 4 hours of vacuum heating. The second method, resulted in a higher grafting level than the first method.

The first grafting method involved coating the ceramic powders with PEG and then grafting by heating in vacuum. This method involved initially coating the alumina powders with PEG by dispersing them in an aqueous PEG solution followed by spray drying. The grafting reaction was completed by heating the coated granules in a vacuum oven. This method may also be used with standard processing equipment and was very efficient in its use of PEG.

PEG binders were coated onto ceramic powders by means of spray drying commonly known to the artisans in ceramic technology. First, equal amounts of alumina powder and distilled water, by weight, were charged into a plastic bottle along with some 6-mm long×4-mm diameter cylindrical alumina milling media. Alternatively, other ceramic milling media such as SiC or $Si_3N_4$ may be used. No deflocculants or surfactants were added. The slurry was ball milled at about 50 to 70 rpm, preferably at 60 rpm for about 15 to 25 hours, preferably 19 hours to disperse any agglomerates that may be present. The appropriate amount of PEG, in the form of flakes, was then added, and the slurry was ball milled for an additional 1 to 3 hours, preferably 2 hours, to dissolve and mix the polymer. In all cases the amount of PEG added is denoted as a weight percentage of the dry ceramic powder. A series of experiments were performed using various wt % of PEGs binder. The milling media were removed with a coarse sieve and the slurry stored briefly in a plastic bottle. In every case, the slurry was spray-dried within a few hours after the end of mixing and there was no indication of settling. The slurry was pumped with a peristaltic pump through a pneumatic atomizer into a mixed-flow spray drier. The spray drier settings were the same for all batches. The coarse spray-dried granules (agglomerates) were collected and stored immediately in airtight containers while the fines were discarded The PEG was grafted to the ceramic powders by heating the spray dried granules in a vacuum oven. The intent was to remove any water remaining after the spray drying or generated from the grafting reaction. It was also intended to remove as much oxygen from the atmosphere as possible to reduce oxidative degradation of the PEG. Temperature was indicated by a small mercury thermometer inserted directly into the granules such that it could be viewed through the glass door of the vacuum oven. Vacuum was maintained by a roughing pump. The vacuum level was maintained around 6 kPa. The granules were placed in the oven at room temperature and evacuated before the heat was turned on. The granules were also cooled under vacuum before being removed from the oven, and then were stored in airtight containers. A series of grafting experiments were conducted to determine the effect of molecular weight, coating level, grafting temperature, grafting time, ultrasonication time, and alumina powder on the amount of PEG that could be grafted to alumina using this technique of ball milling, spray drying and vacuum heating.

The second grafting method involved dispersing alumina powders in an excess of molten PEG under inert gas. The excess ungrafted PEG was removed by repeated washing with distilled water. This method was less efficient in its use of PEG, but assured that a saturation level of PEG was available at the particle surfaces for completing the grafting reaction.

Several glass beakers containing about equal amount of PEGs having various molecular weight and Type A alumina powder were placed inside a vacuum oven and heated to about 180 to 210° C., preferably at about 195° C., for 15 to 30 hours, preferably for 24 hours, under flowing argon gas at 40 to 60 ml/min., preferably at 50 ml/min., to complete the grafting reaction. The excess ungrafted PEG was subsequently removed by repeatedly dispersing in distilled water, centrifuging and decanting the supernatant containing the free, ungrafted PEG. The sediments were re-dispersed in fresh distilled water by agitating in high density polyethylene (HDPE) plastic bottles for a few hours on a shaker table. Centrifuging was done for at least 4 hours, preferably for 10 hours, at 1500 to 2500 rpm, preferably at 2000 rpm, for each washing in order to sediment out the particles. The amount of ungrafted PEG remaining was estimated to be less than 0.004 wt. %. The washed sediments were dried in air for at least 20 hours, preferably for 32 hours at 50 to 70° C. and then stored in air-tight plastic or glass containers.

The amount of PEG grafted to the alumina particle surfaces was determined by loss on ignition (LOI) technique. Samples from the grafted batches, as discussed hereinabove, 5 to 10 g each, were dried further in a vacuum of 6.5 kPa at 200° C. for 6 hours and then immediately sealed in air-tight containers. Porcelain crucibles were calcined in a muffle furnace at 1000° C., cooled to room temperature, and immediately weighed to the nearest 0.01 mg. Each sample was removed from its container, placed in a porcelain crucible, and immediately weighed. The samples were calcined at 1000° C. for at least three hours, and then were cooled slowly so as not to crack the crucibles by thermal shock. The crucibles were removed from the hot furnace and covered immediately while they cooled to near room temperature. The samples and crucibles were then again weighed, and the weight loss was used to calculate the amount of PEG grafted to each batch.

Figure 2:
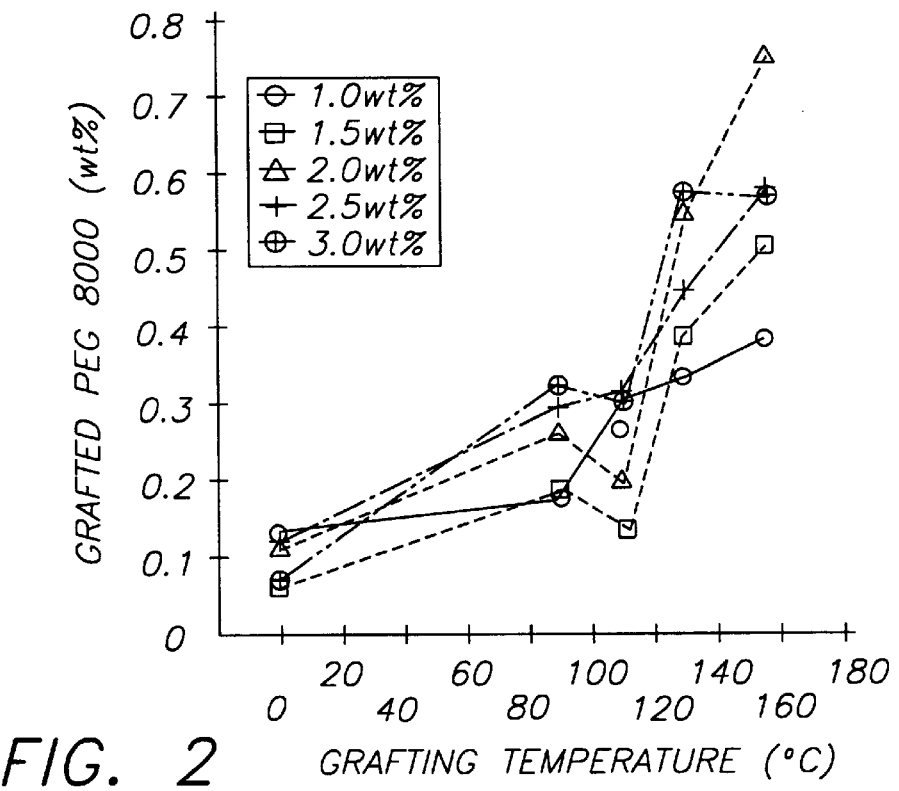
FIG. 2 is a graph of the amount of grafted PEG 8000 on Type A alumina as a function of grafting temperature for various coating levels.

Referring to FIG. 2, the effects of coating level as a function of grafting temperature for batches of Type A alumina powders coated with 1.0, 1.5, 2.0, 2.5, and 3.0 wt % PEG 8000 are presented. A series of samples were placed in small glass vials from each of the batches having different wt % PEG 8000 coated and they were grafted for 18 hours under vacuum at 90°, 110°, 130°, and 155° C. The grafting level for each of the samples is presented in FIG. 2 along with the analysis of samples of spray-dried powder that were not vacuum heated. Higher grafting levels are achieved at the higher grafting temperatures. The grafting level rose steeply within the first 4 to 8 hours and leveled off, but unexpectedly decreased after 16 hours. Characteristics of alumina powders are shown in Table 1.

TABLE 1

Characteristics of two aluminas powders

|  | Type A[1] | Type B[2] |
|---|---|---|
| Specific Surface Area[3] (m²/g) | 7.9 | 7.22 |
| Median Diameter (μm) | 0.35 | 0.4 |
| Loss on Ignition (wt %) | 0.68 | 0.73 |
| Composition[4] (wt %) | | |
| $Na_2O$ | 0.07 | 0.015 |
| $SiO_2$ | 0.03 | 0.025 |
| $Fe_2O_3$ | 0.02 | 0.015 |
| CaO | 0.02 | 0.005 |
| MgO | 0.04 | <0.014 |

[1]A-16SG Alumina, Alcoa Ind. Chemicals Bauxite, AR.
[2]A-39SG Alumina, Alcoa Ind. Chemicals, Bauxite, AR.
[3]Gemini 2375 Multipoint BET, Micrometrics, Norcross, GA.
[4]Alcoa Industrial Chemicals, Bauxite, AR. Chemicals Products Data Sheets CHE 920B and CHE 921.

Table 2 shows the grafting levels of various molecular weights of PEG upon type A alumina and type B alumina powders using the molten polymer reaction technique.

TABLE 2

| Molecular Weight | Grafted PEG (wt %) | Specific Grafting Amount (mg/m²) | Surface conc, σ (molecule/nm²) | $(1/\sigma)/M^{2/3}$ (nm² mole/g molecule) |
|---|---|---|---|---|
| Type A alumina | | | | |
| 600 | 0.77 | 0.97 | 0.97 | 0.015 |
| 1000 | 0.86 | 1.08 | 0.65 | 0.015 |
| 4600 | 1.41 | 1.78 | 0.23 | 0.016 |
| 8000 | 1.52 | 1.93 | 0.15 | 0.017 |
| Type B alumina | | | | |
| 4600 | 1.58 | 2.18 | 0.29 | 0.013 |
| 8000 | 1.63 | 2.25 | 0.17 | 0.015 |

Figure 3:
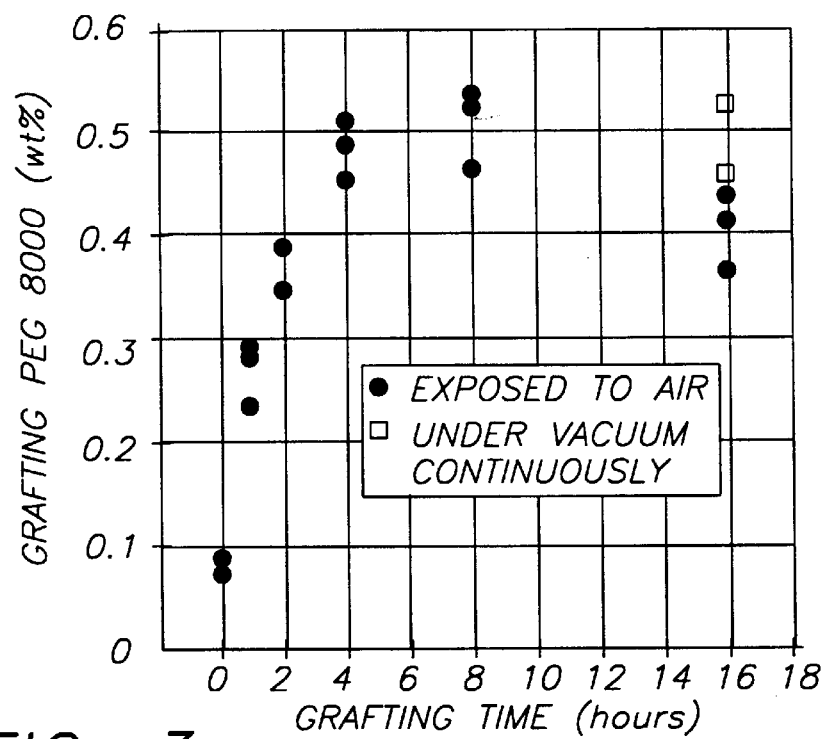
FIG. 3 is a graph of the amount of PEG 8000 grafted to Type A alumina powders as a function of grafting time in vacuum at 140° C. after having the powder coated with 1.5 wt % PEG 8000.

Referring to FIG. 3, the effects of increasing time during vacuum heating on the amount of grafting by the-coat-then-graft method are presented for Type A alumina powders coated with 1.5 wt % PEG 8000. A series of above referenced alumina powder samples were placed in glass vials and then grafted under vacuum at 140° C. with one vial removed after 1, 2, 4, 8 and 16 hours. The grafting level rose steeply within the first 4 to 6 hours and leveled off at and after 16 hours.

Figure 4:
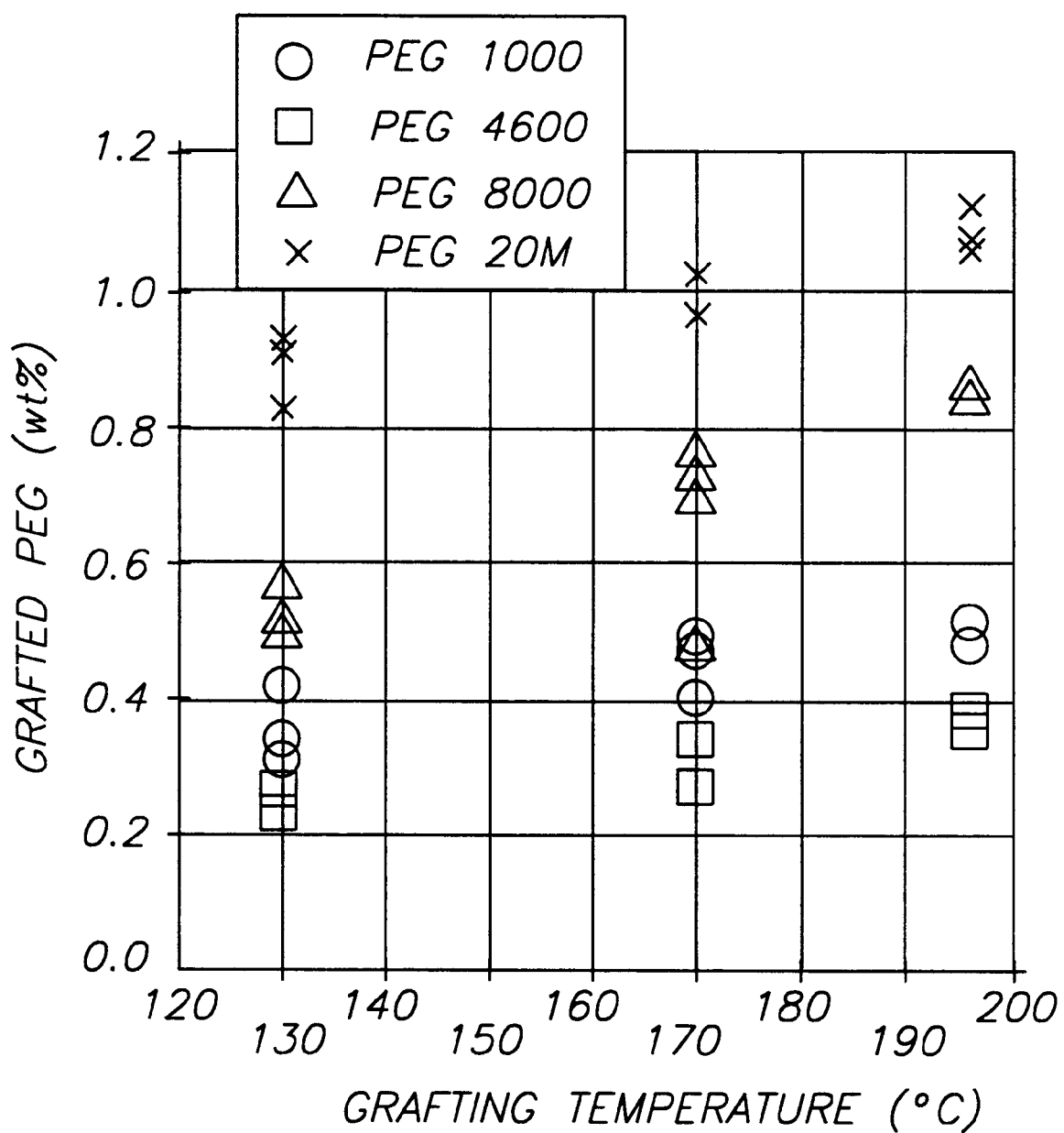
FIG. 4 is a graph of the amount of PEG grafted to Type A alumina as a function of grafting temperature for various molecular weights after vacuum heating for 8 hrs.

Referring to FIG. 4, the effects of molecular weight on the grafting level for batches of Type A alumina powders which were coated with 1.0 wt % PEG 1000 and PEG 4600, and 2.0 wt % PEG 8000 and PEG 20M are presented. 200-gram samples from each batch were placed in beakers and grafted under vacuum at 130°, 170°, and 1956° C. for 8 hours and cooled under vacuum. The grafting levels increased monotonically with increasing temperature for all four molecular weights. PEG 20M has a multimodal molecular weight distribution so it is impossible to infer the effect of the epoxide linker group from this information alone. PEG 1000 is grafted at a slightly higher level than the PEG 4600. However, it is the terminal hydroxyl groups that react with the particle surfaces. For equal weights, PEG 1000 has more than four times as many hydroxyl groups as PEG 4600 that are available to react with the hydroxyl groups on the particle surfaces.

The grafting level increased with increasing molecular weight using both techniques. The grafting levels achieved with the molten PEG reaction technique were significantly higher than the other grafting technique of coat-then-graft. This can be explained as follows. The molecules in the molten polymer (PEG) have more mobility than those in a thin coating layer which is, on average, equivalent to only one to two monolayers thick in the levels that have been applied in this research. This increases the probability that a PEG terminal group in the molten polymer could eventually come in contact with almost every potential bonding site and possibly react. In addition, it is unlikely that the PEG uniformly coats the particles after the spray drying step.

If each PEG molecule occupied the same area on a particle surface, regardless of its molecular weight, the amount of grafted PEG would be linearly proportional to the molecular weight. In this case, the PEG molecules would be terminally attached to the particle surface by one end, and extend approximately normal to the surface without forming loops or trains. But it is possible that the larger molecular weights to have a larger parking area per molecule on the particle surfaces; and, therefore, the grafted amount of PEG would increase at less than a linear rate with molecular weight.

It was observed that the first method, coat-then-graft technique, resulted in grafting levels which are only a fraction of the levels produced by the second method, molten-PEG reaction technique as detailed in Table 2. The grafting efficiency decreased for increasing molecular weight with the coat-then-graft technique. For example, Type A alumina powders were coated with 1.0 wt % PEG 1000 or PEG 4600 and then vacuum heated at a temperature as high as 195° C. This coating level was greater than the grafted amount achieved for the molten-PEG reaction technique for the PEG 1000 (0.86 wt %), but less than the grafted amount achieved for the molten-PEG reaction technique for the PEG 4600 (1.41 wt %). For equal coating levels, the lower-molecular-weight polymer has a higher number of terminal hydroxyl groups available to react with the surface, and probably has more mobility, increasing the chances that the terminal group will come in contact with a potential bonding site on the alumina surface.

Higher grafting levels were achieved using both grafting techniques for the Type B alumina powder compared to the Type A alumina powder. As can be seen from Table 1, Type B alumina is of higher purity, with significantly less sodium, calcium, and magnesium oxide than Type A.

It was possible to graft significant amounts of PEG to the surface of these Type A and B alumina powders using the very simple technique of coating with PEG followed by vacuum heating. The polymer is strongly bonded to the particle surfaces and is not easily removed by severe agitation in a good solvent such as water. The grafting level for all molecular weights investigated increased with increasing grafting temperature. The grafting level reached an equilibrium value in approximately 4 hours of vacuum heating. However, while this technique is relatively quick and simple, the molten-PEG reaction technique resulted in a higher grafting level that was probably much closer to a complete monolayer. A higher specific adsorption level was achieved with the Type B alumina powder compared to the Type A alumina powder using both grafting techniques as shown in Table 2. For example, Type A alumina powders that were coated with 1.0 wt % PEG 4600 and then vacuum heated at 195° C. had lower grafting level than that for the Type B alumina powder grafted (1.41 wt %) using molten PEG reaction technique. On the otherhand, the grafting level for Type A alumina powders that were coated with PEG 1000 (1.0 wt %) using coat-then-graft method was greater than that for Type B alumina powders grafted using molten PEG reaction method. For equal coating levels, the lower molecular weight PEG has a higher number of terminal hydroxyl groups available to react with the surface, and probably has more mobility, increasing the probability that the terminal groups will come more in contact with a potential bonding site on the alumina surface. The difference in higher grafting level for Type B alumina powders for higher molecular weight PEG can be attributed to the presence of more sodium oxide impurity in the Type A alumina compared to the Type B alumina powder thereby lowering the probability of potential bonding sites for the Type A alumina powder.

A distinct advantage of the IFM technique is a more uniform powder dispersion in comparison to conventional CPIM systems. The dispersion technique used for this system was warm ball milling in a sealed plastic bottle, as discussed earlier. The low shear forces in ball milling placed strict requirements on the rheology of the alcohol dispersions. It required that the system had no discernible yield stress at the milling temperature, and that it spontaneously drained away from the milling media solely under the force of gravity. In addition, the system must have sufficient strength at the cold mold temperature such that the molded part can be removed from the mold. A higher solids loading would lead to higher wet green strength, but would also increase the yield stress and viscosity of the slurry feed. Therefore, it was necessary to identify the system with which the highest solids loading may be achieved and still be dispersed by warm ball milling.

Polyethylene glycols(PEGs) grafted to Type A and Type B alumina powders are good steric stabilizer dispersants in liquid media which are better-than-theta solvents for PEGs, including water and warm 2-propanol and warm 2-butanol. The best rheological properties for aqueous dispersions were realized for the powders with the highest levels of grafted PEG, which were presumed to approach a complete monolayer. The aqueous dispersions were all shear thinning. The rheological properties for concentrated aqueous dispersions of PEG-grafted Type A alumina improved in the following order of molecular weight: PEG 600<PEG 1000<PEG 8000<PEG 4600. Aqueous dispersions of PEG 600 and PEG 1000 grafted Type A alumina powder possessed discernible yield stresses.

Experimental results suggested that the Type A alumina powder grafted with PEG 4600 using the molten PEG technique resulted in the most promising rheological characteristics suitable for injection molding. This grafted powder was dispersed in 2-propanol and 2-butanol by warm ball milling at 65° C. The 2-propanol dispersions were sufficiently fluid at 50 vol % solids loading, but quickly increased in viscosity and yield stress for higher solids loading. The 2-butanol dispersions were sufficiently fluid up to 52 vol % solids but became unacceptable by 55 vol %. It was decided to proceed with molding trials with the 2-butanol dispersions at a solids loading of 52 vol %.

The Type A alumina powder grafted with PEG 4600 using the molten PEG reaction technique dispersed well in 2-propanol and 2-butanol solvent held at 65° C., forming fluid slurries with a solids content as high as 52 vol %.

Decreasing the temperature of the alcohol dispersions below about 35° C. resulted in incipient flocculation and caused them to gel into a self-supporting structure at high solids loading at room temperature and below. The flocculation reaction was found to be completely reversible.

It was possible to produce an aqueous suspension at 55 vol % solids loading only with the PEG 4600 grafted Type A powder. The PEG 8000 grafted alumina powder rapidly developed higher viscosity above 50 vol %, which made it more difficult to mechanically disperse and de-air it and make it a good slurry for IFM.

The novel nature of the IFM process may be incompatible with conventional injection molding machines, the majority of which are designed specifically for molding polymers. Most of the commercial injection molding machines are not sufficiently air-tight to contain alcohol vapors and exclude air. Attempts were made to use a commercial powder injection molding machine, Model MIGL-2, manufactured by Peltsman Corporation at Minneapolis, Minn., but were unsuccessful to mold because of a number of reasons which included uneven heating in the holding tank and difficulties in providing dispersion action. As a result, two molding techniques were used to form the green parts without the use of an injection molding machine. The molding technique involved the following process. The PEG grafted ceramic powder was dispersed in alcohol in a plastic bottle and ball milled at 65° C. After the powder was well dispersed, the screw-on bottle cap was quickly replaced with a barbed hose fitting having a 2 to 5 mm orifice. In the first molding technique, a short segment of 2 to 10 mm I.D. plastic tubing was used to connect the plastic bottle to a plastic syringe. The slurry was drawn into the syringe by drawing down the plunger and lightly squeezing the bottle. The cap with the hose fitting, the tubing, and the syringe were preheated to 65° C. The syringe was disconnected from the plastic tubing, capped, and immediately placed in a chamber which was kept at −20° C. to complete the cooling.

In the second molding technique, an aluminum metal mold with a rectangular cavity measuring 10.5 mm×30 mm×61 mm, preheated to 65° C. was used. The slurry was injected into the mold from the plastic mold by applying manual pressure to the bottle until it was filled. The filled mold was immediately sealed and placed in a chamber which was kept at −20° C.

The mold containing the slurry, obtained by using either molding technique, was allowed to cool until the desirable temperature was reached. The green parts were then removed from the molds and placed in a vacuum desiccator to minimize the condensation of moisture on their cold surfaces, and allowed to warm to room temperature. Dry argon gas was metered through the desiccator at approximately 50 ml/min. to drive the 2-butanol from the molded green parts. After 6 to 24 hours, the green parts were heated under vacuum at about 180° C. for about 12 hours to completely remove any remaining solvent. The dried green parts were then sintered in air at about 1600 to 1650° C.

Three rod-shaped specimens, designated R1, R2 and R3, were molded as described above. The linear shrinkage due to drying was approximately 5.0%. Specimen R2 was broken approximately in half and the posterior end, designated R2A, was held in reserve. An obvious molding defect was a number of visible pores connected to the surface due to air bubbles trapped in the alcohol dispersion. The very simple molding technique used did not include a process for removing air from the system, so these defects were anticipated.

Two block specimens were molded using the aluminum metal mold and designated B1 and B2. For specimen B1, the surface for the aluminum mold was coated with a dry lubricant and mold release. For specimen B2, the aluminum mold was coated with a thin layer of a fluorinated oil to serve as a mold release. Specimen B1 released well from the mold, but had a poor surface finish that appeared to be an artifact of filling the mold. Specimen B2 also released well from the mold and had a much smoother surface finish. Both of these specimens also contained a number of visible pores on the surface that originated from trapped air. No cracks were apparent and the texture appeared to be uniform. The linear shrinkage upon drying was about 4%.

No significant shrinkage was observed during molding of the specimens. The two techniques used to mold specimens made it impossible to quantitatively measure shrinkage during molding. The IFM process does not contain large amounts or thermoplastic polymers or wax, so a large change in volume during molding was not anticipated. In general, there is no change in volume associated with the processes of flocculation and deflocculation. However, the thermal expansion of the system components does introduce a small change in volume during the molding process.

Specimens R1, R2, and R3 were sintered in air using Schedules 1, 2, and 3 listed in Tables 3, 4 and 5, the sintering temperatures being 1600°, 1625°, and 1650° C. respectively. To provide a comparative reference, cylindrical specimens were dry pressed from the PEG 4600 grafted Type A alumina powder used to mold specimens R1, R2, and R3 using the IFM process. It was anticipated that the repeated washings necessary to remove the ungrafted PEG after the grafting process may have dissolved and removed the $Mg(OH)_2$ or $MgCO_3$ grain-growth inhibitor added by the supplier into the Type A alumina powder. If this were the case, specimens sintered from the grafted alumina powder would be susceptible to exaggerated grain growth. To serve as a control group, cylindrical pellets having 9.525-mm diameter, were dry pressed to 69 MPa from Type A alumina powder that had been coated with 1.0 wt % PEG 4600, but had not been grafted. The ungrafted powder was prepared by ball milling and spray drying to form coated granules. The granules were passed through a No. 50, 297-micrometer U.S. Standard sieve and conditioned at 84% relative humidity before dry pressing. The pellets dry pressed from ungrafted powder were designated UGP1, UGP2, and UGP3 and were sintered in air using Schedules 1, 2, and 3, respectively. The green density of these dry pressed specimens was 54.2%.

TABLE 3

Sintering Schedule 1

| Segment | 1 | 2 | 3 | 4 | 5 |
|---|---|---|---|---|---|
| Rate (° C./min) | 5 | 10 | 2 | 1 | Furnace Cool |
| Level (° C.) | 900 | 1375 | 1500 | 1600 | 0 |
| Dwell (min) | 0 | 0 | 0 | 24 | End |

TABLE 4

Sintering Schedule 2

| Segment | 1 | 2 | 3 | 4 | 5 |
|---|---|---|---|---|---|
| Rate (° C./min) | 5 | 10 | 2 | 1 | Furnace Cool |
| Level (° C.) | 900 | 1375 | 1500 | 1625 | 0 |
| Dwell (min) | 0 | 0 | 0 | 24 | End |

TABLE 5

Sintering Schedule 3

| Segment | 1 | 2 | 3 | 4 | 5 |
|---|---|---|---|---|---|
| Rate (° C./min) | 5 | 10 | 2 | 1 | Furnace Cool |
| Level (° C.) | 900 | 1375 | 1500 | 1650 | 0 |
| Dwell (min) | 0 | 0 | 0 | 24 | End |

The grafted alumina powders, using both coat-then graft and molten PEG methods, were ground by hand in a mortar and pestle and passed through a No. 50, 297-micrometer U.S. Standard sieve. The sieved powder was conditioned at 84% relative humidity before being dry pressed at 69 MPa into 9.525-mm diameter pellets with a green density of 55.4%. These pellets dry pressed from grafted powder were designated GP1, GP2, and GP3, and were sintered in air using Schedules 1, 2, and 3, respectively (numeral indicates sintering schedule used) at the same time as the rod-shaped specimens.

All nine of the above samples sintered successfully without any observable external cracks. The linear shrinkage and sintered densities are presented in Table 6. The densities of the green dry-pressed pellets were calculated from geometrical dimensions. Archimedes method was used to determine the densities of the sintered rods.

TABLE 6

Linear shrinkage and sintered densities of sintered specimens

| Specimen | Linear Shrinkage (%) | Sintered Density (g/cm$^3$:%) |
|---|---|---|
| R1 | 14.3 | 3.79:95.3 |
| GP1 | 16.9 | 3.87:97.1 |
| UGP1 | 17.6 | 3.90:98.0 |
| R2 | 15.7 | 3.80:95.5 |
| GP2 | 17 | 3.91:98.3 |
| UGP2 | 18 | 3.93:98.8 |
| R3 | 14.6 | 3.85:96.7 |
| GP3 | 16.7 | 3.90:97.9 |
| UGP3 | 17.8 | 3.93:98.8 |

Sintered densities for all nine samples exceeded 95% of theoretical density, 3.98 g/cm$^3$. In every case, the pellets dry pressed from the ungrafted powder, UGP1, UGP2, and UGP3, had the highest densities, 3.90 g/cm$^3$. The three sintered rods molded using the present invention were slightly lower in density, 3.8 to 3.85 g/cm$^3$. Block-shaped specimens B1 and B2 were both sintered using schedule 1. Specimens B1 and B2 sintered to 97% density without any observable external cracks.

Scanning electron micrography supported suspicions regarding the removal of Mg during the preparation of the grafted alumina powder. Both the IFM samples; R1, R2, and R3, and the pellets dry pressed from the PEG-grafted and washed Type A alumina powder; GP1, GP2, and GP3, showed evidence of exaggerated grain growth at all three sintering temperatures suggesting that the grain-growth inhibitor Mg was removed during washing. The specimens dry pressed from the ungrafted and unwashed Type A alumina powder; UGP1, UGP2, and UGP3, showed signs of exaggerated grain growth only for the highest temperature sintering temperature, schedule 3. These results would be consistent with Mg-source grain growth inhibitor being removed from the grafted powder by the repeated washings used to remove the ungrafted PEG. An insoluble source of Mg, such as $MgAl_2O_4$ spinel, could be added to the starting material or reintroduced into the system after the washing step, in order to eliminate this grain growth problem.

The following working examples were carried out.

EXAMPLE 1

4,000 g of Type A alumina powder, 4,000 ml of distilled water and approximately 1,500 ml 4-mm dia×6-mm long cylindrical alumina milling media were charged into an 8-liter HDPE bottle. The slurry was ball milled for 24 hours at 50 rpm. The milling media were removed with a coarse sieve and the slurry stored briefly in air-tight containers. The slurry was spray dried as explained earlier. The coarse granules were saved and the fines discarded. The spray-dried granules were placed in an aluminum pan and dried in a vacuum oven at 2009° C. for 24 hours under a vacuum of ~6.5 kPa. The weight loss was 0.44 wt %.

The beakers were then placed in an oven and heated to 195° C. for 24 hours under flowing argon gas at 50 ml/min to initiate the grafting reaction. The ungrafted PEG was subsequently removed by repeatedly dispersing in distilled water, centrifuging and decanting the supernatant containing the free, ungrafted PEG. The sediments could be redispersed in fresh distilled water by agitating in HDPE bottles for a few hours on a shaker table. It was necessary to centrifuge for 10 hours at 2,000 rpm for each washing in order to sediment out the particles. From the number and dilution factor of the washings, it was estimated that the amount of ungrafted PEG remaining was less that 0.004 wt %. The washed sediments were dried in air for 36 hours at 60° C. and then stored in airtight containers.

EXAMPLE 2

The same procedure was also used to graft PEG to the Type B alumina powders with the exception that the first milling and spray-drying steps were eliminated. There was a concern with the limited amount of material available and the low yields from the spray drier that there would be sufficient powder to conduct experiments. The procedure for Type B alumina powder, therefore, began with the vacuum drying step and then proceeded the same as with the Type A alumina powder.

EXAMPLE 3

The first concern was that the measured amount of PEG grafted to the alumina powders would depend significantly upon how long the suspensions were ultrasonically dispersed. There was the possibility that the intensity of the ultrasonic probe was sufficient to erode the grafted PEG from the particle surfaces. It was also not known how easily the ungrafted or "free" PEG would go into solution. To investigate these concerns, a batch of Type A alumina powder was coated with 1.5 wt % PEG 8000 and grafted for 18 hours at 155° C. under vacuum. During the analysis of the grafting level, a number of sample suspensions were ultrasonically dispersed for 30, 60, and 120 seconds. Heat was generated during the ultrasonic treatment, so it was necessary to repeatedly disperse the suspensions for 30 seconds at a time and then allow them to cool to room temperature. Another sample suspension was not ultrasonically dispersed at all, but was only shaken briefly by hand and then agitated with the other suspensions on the shaker table. There was no significant difference between ultrasonically dispersing the suspensions for 120 seconds and just manually shaking for a few seconds. This indicated that the PEG grafted to the alumina surface was bonded strongly. This also indicated that the ungrafted "free" PEG went into solution relatively easily.

EXAMPLE 4

In order to investigate the effects of coating level and grafting temperature, batches of Type A alumina powder were prepared coated with 1.0, 1.5, 2.5, 2.5, and 3.0 wt % PEG 8000. The 20-g samples in 20-ml glass vials from each of the batches were grafted for 18 hours under vacuum at 90°, 110°, 130°, and 155° C. The grafting level for each of the samples is shown in FIG. 2 along with the analysis of samples of spray dried powder that were not vacuum heated. Higher grafting levels were achieved at higher grafting temperatures. The results also indicated that there was no direct correlation between the coating level and the grafting level.

EXAMPLE 5

The time dependence of the grafting reaction was investigated by coating a batch of Type A alumina with 1.5 wt % PEG 8000 and grafting samples for increasing lengths of time. First, 10.0-g samples were placed in 20-ml glass vials, and then grafted under vacuum at 140° C. with one vial removed after 1 hour, 2, 4, 8, and 16 hours. The grafting level is presented in FIG. 3. The grafting level rose steeply within the first 4 to 6 hours and then leveled off and surprisingly decreased around 16 hours. Another group of samples were grafted again for 16 hours to determine the repeatability, but the grafting level for the second group was slightly higher than the first group and was more nearly equal to the grafting levels at 4 and 8 hours. The first group of samples was grafted by initially placing all of the sample vials in the vacuum oven and the opening the door and quickly removing a vial after the prescribed time and sealing it immediately. It took several minutes then to evacuate the furnace causing the remaining samples to oxidize to some extent which may have resulted in lower grafting levels at 16 hours. It was concluded form this experiment that the grafting level reached the maximum at about 4 hours.

EXAMPLE 6

The effects of molecular weight and higher grafting temperatures were investigated with this series. Batches of Type A alumina powder were coated with 1.0 wt % PEG 1000 and PEG 4600 and with 2.0 wt % PEG 8000 and PEG 20M. Then 200-g samples from each batch were placed in glass beakers and grafted under vacuum at 130°, 170°, and 195° C. for 8 hours and cooled under vacuum. The grafting levels increased monotonically with increasing temperatures for all four molecular weights as shown in FIG. 4. PEG 20M has a multimodal molecular weight which made it difficult to infer the effects of molecular weight from this experiment. Surprisingly, PEG 100 grafted at a higher level than the PEG 4600 which may be due to the presence of more terminal hydroxyl groups that react with the particle (alumina) surfaces. For equal weights, PEG 1000 has more than four times as many hydroxyl groups as PEG 4600 that are available to react with the hydroxyl groups on the particle surfaces.

EXAMPLE 7

A batch of Type B alumina powder was coated with 2.0 wt % PEG 8000. A 200-g sample was grafted under vacuum for 8 hours at 160° C. The grafting level was measured to be 1.33 wt %, significantly higher than for the Type A powder grafted under nearly identical conditions. This difference may be due to the differences in surface chemistry between the two alumina powders as illustrated in Table 1.

The 320 grams of PEGs to be grafted were placed in 600-ml glass laboratory beakers. The PEGs were melted under vacuum to 100° C. to assure that they were dry. Next, 400 grams of the dried Type A alumina powder was dispersed into the molten PEG with an impeller mixer for 30 minutes. The batch was then de-aired in a vacuum desiccator until no more bubbles rose to the surface. Each batch was then dispersed with the impeller mixer again for 30 minutes. During this process, it was necessary to heat the mixture in a microwave oven repeatedly (PEG is a strong microwave absorber) to keep it molten. Undispersed granules were observed in the batches, so this process although operable, did not produce a perfect dispersion.

EXAMPLE 8

2,000 g of alumina powder and 2,000 ml of distilled water were charged into a 4-liter HDPE bottle along with 1,000 ml of 4-mm dia.×6-mm long cylindrical alumina milling media. No deflocculants or surfactants were added. The slurry was ball milled at 60 rpm for 19 hours to disperse agglomerates. The appropriate amount of PEG, in the form of flakes, was then added, and the slurry was ball milled for an additional 2 hours to dissolve and mix the polymer. In all cases the amount of PEG added is denoted as a weight percentage of the dry ceramic powder. The slurry developed a yield stress when the PEG was added which prevented further milling during this mixing stage. It is therefore believed that there was no mechanical degradation of the PEG during this stage. The milling media were removed with a coarse sieve and the slurry stored briefly in a 3.75-liter HDPE bottle. In every case, the slurry was spray-dried within a few hours after the end of mixing and there was no indication of settling. The slurry was pumped with a peristaltic pump through a pneumatic atomizer into a mixed-flow spray drier. The spray drier settings were the same for all batches. The coarse spray-dried granules were collected and stored immediately in airtight containers while the fines were discarded. Yields were typically around 40%.

The invention has been described in detail with particular reference to certain preferred embodiments thereof, but it will be understood that variations and modifications can be effected within the spirit and scope of the invention.

What is claimed is:

1. A process for molding particulate inorganic materials to net shape comprising the steps of:

i.) grafting a dispersant for said inorganic material on said inorganic material to prepare a grafted inorganic material;

ii.) mixing said grafted inorganic material and a solvent for;

iii.) milling the mixture of step ii) at a temperature from 55 to 70° C. to provide a sterically stabilized suspension;

iv.) filtering the mixture of step iii;

v.) deairing the mixture of step iv;

vi.) molding the mixture of step iii) by cooling into a desired green body by incipiently flocculating the suspension in a the mold;

vii.) drying the green body of step iv); and viii.) sintering the green body of step v).

2. The process of claim 1 wherein the particulate inorganic material is selected from the group consisting of alumina, zirconia, magnesia, titania, silicon carbide, silicon nitride, and zirconia-alumina composites.

3. The process of claim 2 wherein the inorganic material is alumina.

4. The process of claim 1 wherein the dispersant is selected from the group consisting of polyethylene glycol, (methyl) cellulose, hydroxypropyl cellulose, polyacrylic acid, hydroxypropyl methylcellulose, stearyl alcohol, polymethacrylic acid, and polyethylene oxide, grafted to particulate inorganic powders.

5. The process of claim 4 wherein the dispersant is polyethylene glycol grafted to alumina.

6. The process of claim 1 wherein the grafting of dispersant to said inorganic particles includes coating powders of the inorganic particles with dispersant by dispersing in a solution and spray drying and heating.

7. The process of claim 1 wherein the grafting of dispersant to said inorganic particles includes dispersing powders of the inorganic particles in an excess of molten dispersant and removing ungrafted dispersant.

8. The process of claim 1 wherein the inorganic particles are mixed with from 1 to about 3 weight percent of dispersant.

9. The process of claim 1 wherein step iii) is carried out using milling media.

10. The process of claim 1 wherein the deairing is carried out in a vacuum chamber.

11. The method of claim 1 wherein step vi) is carried out at temperatures of from −30 to 20° C.

12. The method of claim 1 wherein step vii) is carried out at temperatures of from −20 to 25° C. for 1 to 24 hours.

13. The process of claim 1 wherein step viii) is carried out at temperatures of from about 1500 to 1800° C. from ½ to 4 hours.

14. The process of claim 1 wherein after step viii) the molded and sintered inorganic material is sent to be finished.

15. The process of claim 1 wherein after step viii) sprues and runners are recycled back to step ii).

16. The process of claim 1 wherein after step viii, rejects are recycled back to step ii).

* * * * *